United States Patent [19]
Belknap

[11] 3,756,301
[45] Sept. 4, 1973

[54] TRACTION DEVICE FOR VEHICLE TIRES

[76] Inventor: John C. Belknap, 229 S. Shore Dr., Buffalo, N.Y. 14219

[22] Filed: Sept. 13, 1971

[21] Appl. No.: 179,965

[52] U.S. Cl. .............................................. 152/225
[51] Int. Cl. ........................................... B60c 27/20
[58] Field of Search ............... 152/225, 225 C, 236, 152/237

[56] References Cited
UNITED STATES PATENTS

| | | | |
|---|---|---|---|
| 1,346,623 | 7/1920 | Barber | 152/225 C |
| 2,845,978 | 8/1958 | McKenzie | 152/225 C |
| 1,329,764 | 2/1920 | Holmes | 152/225 |

Primary Examiner—James B. Marbert
Attorney—Ashlan F. Harlan, Jr.

[57] ABSTRACT

A traction device comprising a pair of laterally spaced rods connected to the opposite ends of an elongated shoe element to form a generally U-shaped configuration engagable against the side walls and the peripheral surface of a vehicle tire. Adjustably mounted plates project inwardly from the rods in spaced, substantially parallel relation to the shoe element for clamping engagement behind the rim of the wheel to firmly secure the shoe element against the peripheral surface of the tire. One of the rods may be formed integral with the shoe element while the other is detachably and adjustably secured to the latter.

11 Claims, 4 Drawing Figures

PATENTED SEP 4 1973

3,756,301

INVENTOR.
JOHN C. BELKNAP
BY
Asllan J. Harlan Jr.
ATTORNEY

TRACTION DEVICE FOR VEHICLE TIRES

BACKGROUND OF THE INVENTION

This invention relates to a traction device adapted to be readily applied and secured to a vehicle tire and removed therefrom.

Various types of vehicle tire traction means have been developed to facilitate the movement of a vehicle in snow, ice, mud and other slippery road and ground surfaces. Sometimes, such means are incorporated in the tire itself by a relatively thick, specially configurated, tread design or by the provision of studs projecting radially outwardly from the peripheral surface of a tire. However, these are usually not adequate when the tire becomes somewhat embedded in soft, slippery, or flowable material such as snow, mud or sand. Accordingly, traction devices in the form of separable attachments, for example chains, have been designed for temporary securement to a vehicle tire or wheel for abnormally adverse conditions, for example being stuck in a mud hole, or driving in deep snow, and which can be removed from the tire when conditions no longer require it.

While these known tire traction attachments are generally suited for the purposes for which they were designed, they have certain short-comings. For example, they are generally awkward and cumbersome to apply to a vehicle tire, are expensive, and often require the vehicle to be raised in order to lift the tire from the ground in order to properly fit the attachment on the tire. This poses a difficult, if not insoluble, problem when a vehicle wheel is partially buried in sand, snow, or a mud-hole. Also, very often the proper application of these devices to the vehicle tire requires the efforts of more than one person and a lone driver is unable to apply them.

SUMMARY OF THE INVENTION

The traction device of the present invention, as hereinafter described, obviates the deficiencies noted above by providing an improved traction device which can be easily applied to and removed from a vehicle tire with a minimum of effort by a single person without lifting the tire from the ground, which is simple and strong in construction, durable and rugged in use, relatively low in cost, and which can be easily stowed away in the vehicle.

Generally speaking, the traction device of this invention comprises a pair of laterally spaced rods connected to the opposite ends of an elongated main rod and forming when parallel a generally U-shaped configuration engagable with the side walls and the peripheral tread, respectively, of a vehicle tire. The laterally spaced rods are provided with plates extending inwardly toward each other for clamping engagement on the inner annular surface of the rim of the vehicle tire. The rods and plates are adjustably mounted for firmly securing the traction device to the vehicle tire, the main rod serving as a lug to provide improved traction.

DETAILED DESCRIPTION OF A PREFERRED EMBODIMENT

Figure 1:
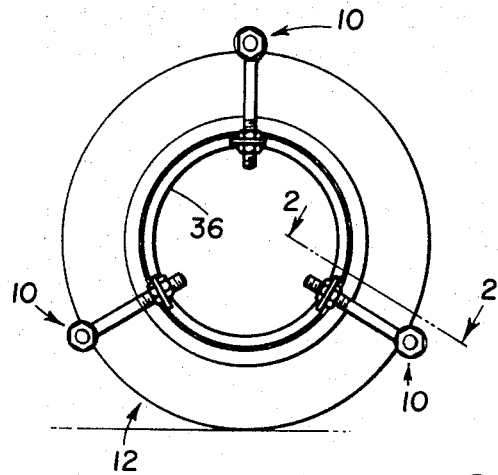
FIG. 1 is a side elevational view of a vehicle tire provided with a plurality of traction devices constructed in accordance with the principles of this invention.

Referring now in detail to the drawing, in FIG. 1 a plurality of traction devices, generally designated 10 and constructed in accordance with this invention, are shown attached to a vehicle tire 12. While three traction devices 10 are shown secured to the tire 12 in the illustrative embodiment of FIG. 1, it should be understood that less than three such devices may be used, the number of traction devices to be applied to a vehicle tire being dictated by the requirements of a particular situation.

Figure 2:
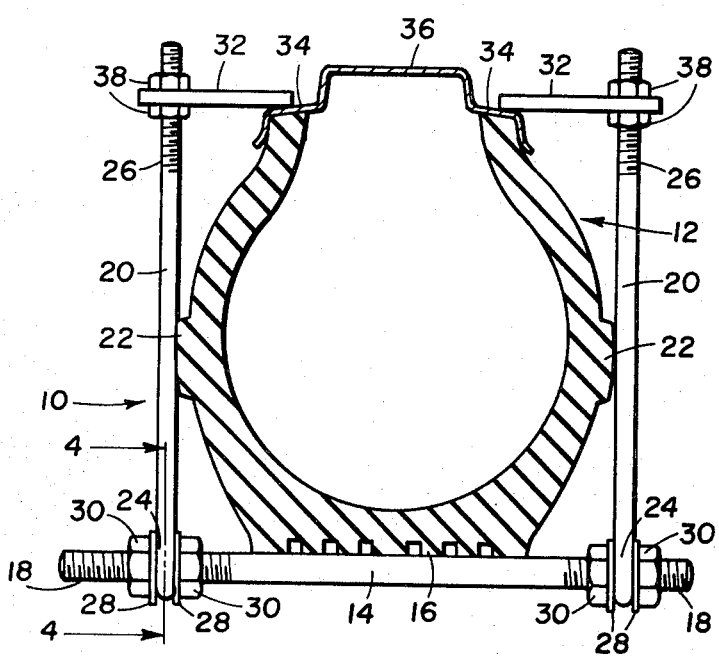
FIG. 2 is a cross-sectional view, on an enlarged scale, taken on the plane of line 2—2 of FIG. 1 and showing one form of traction device of this invention in front elevation.

As shown in the illustrative embodiment of FIG. 2, each traction device 10 comprises an elongated main rod 14 adapted to bear against the peripheral tread 16 of tire 12 and which serves as a gripping shoe element for engagement with the ground to provide traction.

Figure 4:
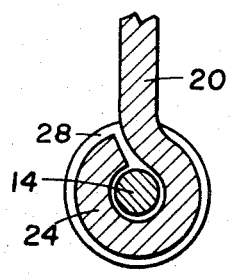
FIG. 4 is a fragmentary vertical sectional view, taken on the plane of line 4—4 of FIG. 2, showing a portion of the traction device of FIG. 2.

The main rod 14 is provided with threaded portions 18 at the opposite ends thereof. A pair of elongated, laterally spaced clamping rods 20 are carried by the rod 14 adjacent the opposite ends thereof and extend normal to rod 14 to form a generally U-shaped configuration. The rods 20 are engagable with the opposite side walls 22 of tire 12. An eye or loop formation 24 (FIG. 4) is provided at one end of each rod 20 for receiving the rod 14 therethrough, the other end of each rod 20 being threaded as at 26. The loop formation 24 of each rod 20 is sandwiched between a pair of washers 28 and adjustably secured in place on an end 18 of the rod 14 by suitable nuts 30.

In order to attach the traction device 10 on the vehicle tire 12, a pair of elongated, generally flat clamping plates 32 are adjustably mounted on the threaded ends 26 of the rods 20. These plates 32 are provided with suitable, preferably threaded, openings at their one ends for engagement on the rods 20 and extend laterally inwardly from the rods 20 toward each other for clamping engagement against the inner annular surfaces 34 of the tire rim 36 when the rods 20 are parallel. A pair of nuts 38 are threaded on the end portion of each rod 20 on opposite sides of the plate 32 for adjustably securing the latter in position on its associated rod 20.

Each traction device 10 is relatively simple in construction and can be easily assembled and mounted, or dismantled, as required. A plurality of these traction devices 10 can be conveniently stowed in the vehicle trunk in either an assembled or disassembled relation, as desired. For quick and easy attachment to the vehicle tire 12 when necessary, the traction device 10 can be stored in two partially assembled sections, the first section including the rod 14 with one of the rods 20 rigidly secured thereto and providing with an attached plate 32 spaced relative to the rod 14 a predetermined distance approximating the height of the specific tire to which it is to be applied. When the attachment of the traction device 10 to the tire 12 of a vehicle drive wheel is required, this first section can be applied as a unit on the tire 12 with the clamping plate 32 thereon engaging behind the wheel rim 36 on the inner side, i.e. the side toward the vehicle, of the tire 12 and with the rods 20 and 14 of the section swung into position against the inner side wall 22 and the tread 16, respectively, of the tire. The second section, which includes the other rod 20 and the plate 32 loosely mounted thereon, can then be readily attached to the first section by slipping the loop formation 24 in place over the free end of the main rod 14 and making the necessary adjustments to firmly secure the traction device 10 about the tire 12. One or more of these traction devices 10 may be attached to the tire 10, as deemed necessary in a specific situation. After the first attachment is installed, the wheel may be successively rotated to permit installation of others.

Figure 3:
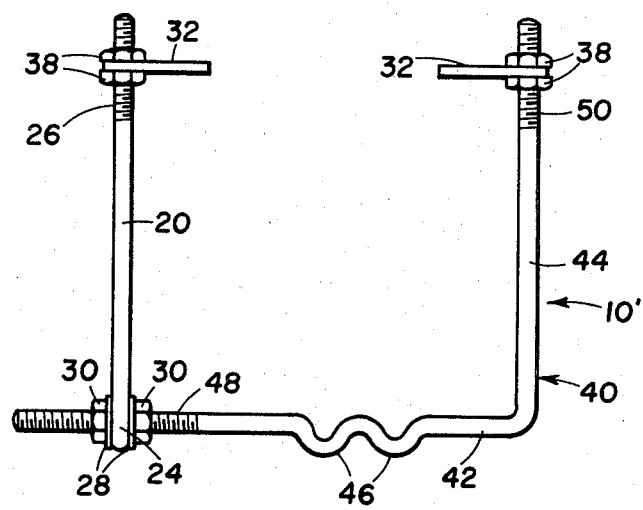
FIG. 3 is a front elevational view of another form of traction device of this invention.

FIG. 3 illustrates another form of traction device of this invention, comprehensively designated 10', which is identical in purpose and very similar in general appearance to the form of the invention first described, except that instead of the main rod 14 and both rods 20 being separate, a single element 40 is employed which incorporates both the gripping shoe and one of the laterally spaced rods. This permits, when desired, a reduction in the number of parts required and the carrying out of fewer steps to completely assemble or diassemble the traction device. As shown in FIG. 3, the element 40 has a generally reversed L-shaped configuration provided with right-angularly related legs 42 and 44 for engagement against the tire tread 16 and the inner sidewall 22, of the tire, respectively. Leg 42 serves as the gripping shoe element for engagement with the ground and may be provided with undulations 46, if desired, to increase ground contact. Leg 42 is provided with a threaded portion 48 at its distal end for detachably and adjustably securing the rod 20 thereon. The distal end of leg 44 also is provided with a threaded portion 50 for detachably and adjustably securing a flat clamping plate 32 thereon. Since the other components of traction device 10' are identical in structure to and largely interchangable with certain of the elements described in the first form of the invention illustrated in FIG. 2, the same reference characters are used to identify similar parts. Traction device 10' may be attached to and removed from the vehicle tire 12 in two sections in the same manner as described above in connection with traction device 10 or assembled but with the rod 20 freely rotating on leg 42.

While the material of which the various elements comprising traction devices 10 and 10' preferably is metal, such as steel, it should be understood that any suitable material having the necessary strength, rigidity and durability may be used, if desired. It will be understood that the rods employed in the devices of the present invention may be of any desired diameter and cross-sectional configuration and, if desired, may be threaded throughout their lengths. Further, although as explained above, a specific device can be adjusted to fit a number of tire sizes, smaller and larger devices can be constructed, thus permitting the use of such devices on tires of any size.

In use, as the weight of the wheel and the load carried thereby rests on the shoe element, the height of the tire at that point is diminished and the clamping plates 32 are forced away from the rim surface. However, this is accompanied by outward bulging of the tire sidewalls so that the rods 20 (FIG. 2) or the rod 20 and leg 44 (FIG. 3) of the device are gripped firmly by the tire to hold them in place. The threading of the mounting holes in the plates 32, referred to above, minimizes rotation of the plates relative to the tire.

The present invention thus provides a simple and inexpensive traction device adapted for each attachment to and removal from a vehicle tire by a single person with a minimum of effort and inconvenience. The traction device can be conveniently and compactly stowed for quick and convenient application to the vehicle tire when the need arises.

While preferred embodiments of the principles of this invention have been described and illustrated in detail and certain possible modifications mentioned, it should be understood that numerous other modifications thereof can be made without departing from the broad spirit and scope of this invention, as defined in the appended claims.

I claim:

1. A traction device for use with a vehicle tire mounted on a rim comprising: a shoe element engagable with the peripheral surface of a vehicle tire and extending thereacross; a pair of laterally spaced rods connected at their one ends to the opposite ends of said shoe element, said rods extending in a direction generally normal therefrom and adapted to form a generally U-shaped configuration; a plate member connected to the other end of each of said rods, said plate members projecting inwardly from said rods toward each other and having inner ends engagable with the inner annular surfaces of the rim of said vehicle tire; means adjustably mounting at least one of said rods on said shoe element; and means adjustably mounting said plate members on said other ends of said rods.

2. A traction device as set forth in claim 1 wherein said means adjustably mounting said rod on said shoe element comprises a pair of nuts threaded on said shoe element on opposite sides of said one end of said rod, and a pair of washers sandwiched between said nuts and said end of said rod.

3. A traction device as set forth in claim 1 wherein said means adjustably mounting said plate members on said rods comprises a pair of nuts threaded on the other end of each of said rods on opposite sides of the associated plate.

4. A traction device as set forth in claim 1 wherein each of said rods is provided with a loop formation at said one end thereof for engagement about said shoe element, and means is provided for adjustably securing each of said rods on said shoe element.

5. A traction device as set forth in claim 1 wherein the other of said rods is formed integral with said shoe element and extends laterally therefrom in a direction generally normal thereto.

6. A traction device as set forth in claim 1 wherein said shoe element is a rod threaded on its ends.

7. A traction device as set forth in claim 1 wherein said plate members are threadedly mounted on said rods.

8. A traction device as set forth in claim 7 whereina pair of nuts are threaded on the other end of each of said rods on opposite sides of the associated plate member.

9. A traction device as set forth in claim 8 wherein each of said rods is provided with a loop formation at said one end thereof for engagement about said shoe element, and means is provided for adjustably securing each of said rods on said shoe element.

10. A traction device for use with a vehicle tire mounted on a rim comprising: a shoe element engagable with the peripheral surface of a vehicle tire and extending thereacross, said shoe element being a rod threaded at its ends; a pair of clamping rods, each of said clamping rods being provided with a loop at one end thereof and a threaded portion at the other end thereof, said clamping rods being adjustably secured, by threaded nuts, to opposite ends of said shoe element and extending generally normal to said shoe element, whereby to form when parallel a generally U-shaped configuration; a plate member threadedly secured to the threaded portion of each of said clamping rods, said members when extending inwardly from said clamping rods toward each other being engagable with the inner annular surfaces of the rim of said vehicle tire; and nuts adjustably securing said plate members on said clamping rods.

11. A traction device for use with a vehicle tire mounted on a rim comprising: a shoe element engagable with the peripheral surface of a vehicle tire and extending thereacross; a pair of laterally spaced rods connected at their one ends to the opposite ends of said shoe element, said rods extending in a direction generally normal therefrom and adapted to form a generally U-shaped configuration; a retaining member provided on the other end of one of said rods, said retaining member projecting inwardly from said rod toward the other of said rods and having an inner end engagable with an inner annular surface of the rim of said vehicle; and means adjustably mounting at least one of said rods on said shoe element.

* * * * *